United States Patent [19]

Belart et al.

[11] Patent Number: 4,600,243
[45] Date of Patent: Jul. 15, 1986

[54] HYDRAULIC SERVO BRAKE FOR MOTOR VEHICLES

[75] Inventors: Juan Belart, Walldorf; Jochen Burgdorf, Offenbach-Rumpenheim; Dieter Kircher, Frankfurt am Main; Lutz Weise, Mainz, all of Fed. Rep. of Germany

[73] Assignee: Alfred Teves GmbH, Frankfurt am Main, Fed. Rep. of Germany

[21] Appl. No.: 745,401

[22] Filed: Jun. 14, 1985

[30] Foreign Application Priority Data

Jun. 14, 1984 [DE] Fed. Rep. of Germany ....... 3422155

[51] Int. Cl.[4] .......................... B60T 8/02; B60T 13/12; B60T 17/18
[52] U.S. Cl. .................................... 303/92; 188/345; 188/151 A; 303/114; 303/116
[58] Field of Search ......... 303/114, 116, 119, DIG. 2, 303/117, DIG. 1, 52, 56, 10–12, 6 R, 92, 84 A, 11, DIG. 4; 188/181 A, 181 R, 345, 151 A, 358–359; 60/545, 547.1, 581

[56] References Cited

U.S. PATENT DOCUMENTS

| | | | |
|---|---|---|---|
| 4,395,072 | 7/1983 | Belart | 303/114 |
| 4,440,454 | 4/1984 | Belart et al. | 303/114 |
| 4,521,061 | 6/1985 | Belart et al. | 303/114 |

Primary Examiner—Douglas C. Butler
Attorney, Agent, or Firm—James B. Raden; William J. Michals

[57] ABSTRACT

In a hydraulic motor vehicle servo brake comprising a tandem master cylinder (11), a brake valve (17) is provided which upon actuation through the brake pedal (16) applies, in controlled manner, pressure medium supplied by a hydraulic pump (18) connected to an intake reservoir (27) to the first master piston (24) and to a brake circuit (III) directly, to provide there a controlled pressure. A wheel slip brake control system at an initial slip of one or more motor vehicle wheels, will reduce automatically the brake force on the motor vehicle wheels to a value just sufficient to turn the wheels. Two switch valves (21, 21') to which the controlled pressure is applied are normally closed and open upon a beginning slip of one or several motor vehicle wheels to apply the controlled pressure to the master cylinder (11) from where the pressure medium is passed by way of two check valves (23, 123) to the pressure chambers located behind the master pistons (24, 80). The switch valves are actuated by way of a differential pressure control circuit (148) in response to exceeding a predetermined pressure difference in the two pressure chambers (76, 176) such that the switch valve connected to a defective brake circuit will be closed.

9 Claims, 2 Drawing Figures

HYDRAULIC SERVO BRAKE FOR MOTOR VEHICLES

BACKGROUND OF THE INVENTION

The present invention relates to a servo brake for motor vehicles comprising a pedal-operated tandem master cylinder including two master pistons, wheel brake cylinders connected thereto by way of at least one brake circuit, a brake valve connected between the pedal and the first master piston, which brake valve upon actuation by the brake pedal applies, in controlled manner, pressure medium supplied by a hydraulic pump connected to an intake reservoir to the first of the master pistons. Optionally, the pressure medium is supplied to a brake circuit directly to provide a controlled pressure. The servo brake further comprises a wheel slip brake control system which at an initial slip occurring on one or several motor vehicle wheels, will automatically reduce the brake force on the motor vehicle wheels to a value just permitting the wheels to turn. The brake control system includes a switch valve to which the controlled pressure is equally applied which switch valve is normally closed. The control system opens at an initial slip of one or more motor vehicle wheels to apply the controlled pressure of the master cylinder from where the pressure medium will be passed by way of two check valves to the pressure chambers located behind the master pistons to which pressure chambers the brake circuits are connected.

In conventional motor vehicles servo brakes of this type, a common switch valve is provided for both master piston pressure chambers which will open upon the initial wheel slip thereby supplying the controlled pressure, by way of the check valves, directly into the two brake circuits to replace there used-up pressure medium directly by the pump and the accumulator respectively.

The disadvantage envolved with the conventional system is that in the event of a failure of a brake circuit, (for example, due to leakage) upon occurrence of a wheel slip, pressure medium is continuously supplied into the defective brake circuit which could exceed the capacity of the pump provided thereby constituting a safety risk. If in case of such a failure the switch valve were turned off (that is, closed) no wheel slip brake control of the still intact brake circuit would be possible.

It is, therefore, the object of the present invention to provide a motor vehicle brake of the type described in which in the event of a failure of one of the two brake circuits to which pressure is applied by the master pistons, the supply of pressure medium into the defective brake circuit upon occurrence of a wheel slip will be avoided while the wheel slip control on the still intact brake circuit will be unaffected.

SUMMARY OF THE INVENTION

According to the present invention, a special switch valve is provided for each pressure chamber, with each of such switch valves being connected to the wheel slip brake control system by way of a differential pressure control circuit which in response to exceeding a predetermined pressure difference in the two master cylinder pressure chambers indicative of the failure of a brake circuit, will close the switch valve of that pressure chamber in which the lower pressure prevails.

In view of this construction it is possible for the switch valve individually associated to each of the two master piston pressure chambers, in the event of a leakage in the brake circuit concerned to be individually switched off without affecting the wheel slip brake control of the other brake circuit.

The pressure signal provided by each of the two brake circuits can be either an electric or a hydraulic signal.

Preferably, the pressures in the two brake circuits are hydraulically applied to the differential pressure control circuit whereas electric signals will be provided thereby for the control of the electromagnets of the two switch valves.

In an advantageous practical embodiment of the present invention, the differential pressure control circuit comprises a three-position differential pressure slide arrangement which, by way of hydraulic control conduits, is connected by respectively one of the brake circuits to which pressure is applied by the master cylinder, and includes two switches of which, in the one end position, a first one is open and the second one closed and, in the other end position, the second one is open and the first one closed whereas, in the mid-postion, both switches are closed, and that the switches are connected into the feed-in lines leading to the switch valves.

For this, special provision can be made for that the differential pressure slide arrangement comprises a cylinder and a slide displaceably disposed therein, which includes two end pistons and, disposed therebetween, two switch ramps tapering with respect to one another and cooperating with respectively one of the switches provided on the cylinder, with a straight-lined connecting piece extending between the switch ramps.

A development of this form of embodiment is characterized in that push rods extending substantially normal to the straight-lined connecting piece are provided on the switches, which push rods cooperate with the switch ramps and the straight-lined connecting piece in the sense actuating the switches.

In order to safeguard a precise mid-position of the slide the invention, furthermore, provides, feasibly, that one of the end piston, preferably the one connected to the pressure chamber of the second master piston, is of an enlarged diameter and is accommodated in a cylinder section provided with a correspondingly larger diameter, with the end piston concerned, normally, being in abutment with the annular step at the junction to the cylinder section provided with a correspondingly larger diameter.

Advantageously, each switch valve will connect the associated chambers disposed behind the check valves, in closed condition, to the intake reservoir so that normally, i.e. in the case where no wheel slip brake control will take place, the chambers behind the check valves are connected to the intake reservoir so that the pressure medium consumed during each braking operation can always be replenished.

BRIEF DESCRIPTION OF THE DRAWING

The invention will not be described with reference to the drawing, wherein.

DETAILED DESCRIPTION

Figure 1:
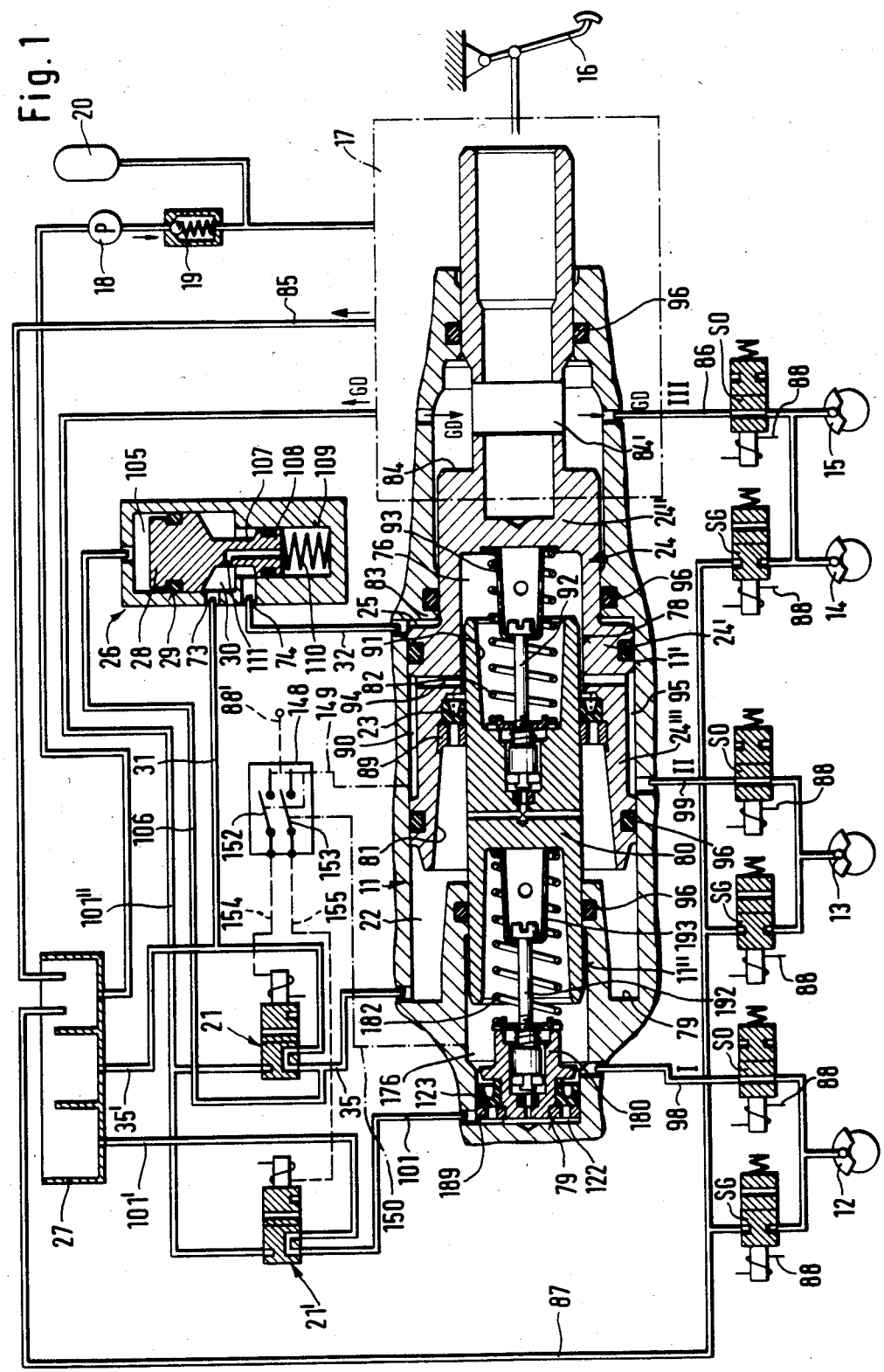
FIG. 1 is a preferred embodiment of a motor vehicle brake according to the invention, with the tandem master cylinder being shown in axial section and the remaining components as a block diagram; and, FIG. 2 is a partial sectional side view of a differential pressure slide arrangement used with the motor vehicle brake of the present invention.

According to FIG. 1, in a tandem master cylinder 11 comprising an outwardly protruding annular step 83 is arranged in axially displaceable manner a correspondingly step-shaped outwardly protruding master piston 24. Hence, the master piston 24 includes a step-shaped expansion 24' while the master cylinder 11 includes a step-shaped expansion 11'.

Provided between brake pedal 16 and the master piston 24 is a brake valve 17 only indicated by a dash-dotted framing, to which brake valve pressure is applied, by way of a check valve 19, by a pump 18 and an accumulator 20, respectively, connected thereto in parallel. Upon actuation of the brake pedal 16, the brake valve 17 will apply, in controlled manner, a controlled pressure GD generated in the control pressure chamber 84', to the front face 84 of the master piston 24.

Seals 96 perform the required sealing functions between the individual pressure chambers 22, 76, 84, 174 to be separated from one another.

In order to return the pressure medium to the intake reservoir 27 displaced during releasing of the brake, the brake valve 17, moreover, is connected to the intake reservoir 27 by way of hydraulic conduit 85.

The brake valve 17 and the brake force booster connected thereto are of a conventional construction.

The master piston 24, on the side facing away from the pedal 16, is provided with a cylindrical bore 78 which is separated from the front face 84 by the piston bottom 24". In this manner, the master piston 24 is provided with an annular section 24''' into which extends from the master cylinder bottom 79 a second master piston 80 of a constant outer diameter. The second master piston 80, on the front end thereof, is provided with an axial recess 91 in which is located a restoring spring 82 extending to the bottom 24" of the master piston 24. Equally disposed in the recess 91 is an axial stop bolt 92 which, onesidedly, is secured to the second master piston 80 and, with the head thereof provided on the other end, will back a stop sleeve 93 secured to the bottom 24" of the master piston 24 thereby limiting the restoring movement of the master piston 24 caused by the restoring spring 82.

The tandem master cylinder 11 in the area of bottom 79 thereof is provided with a secondary cylinder 11". The second master piston 80 not only is axially displaceable within the first master piston 24 but also extends with the rear end area thereof into the secondary cylinder 11" formed on the bottom 79 which, in turn, protrudes as a sleeve into an annular chamber 22 surrounding the second master piston 80, and the pressure chamber 176 of which, by way of a hydraulic conduit 98, is connected to the brake circuit I.

Moreover, a conduit 101' leads from the intake reservoir 27 by way of a switch valve 21' to an annular chamber 122 in the rearmost section of the master cylinder 11 which, by way of an annular aperture 189 and a check valve 123 formed as a sealing cup is connected to the compression chamber 176 to which pressure is applied by the second master piston 80. Located similarly as restoring spring 82 and stop means 92, 93 of said first master piston 24 are restoring spring 182 and another stop means 192, 193 between the second master piston 80 and the cylindrical support part 180 which is secured to the master cylinder bottom 11 and on which are formed the apertured ring 189 and the check valve 132.

An outer annular chamber 95 on ring portion 24''' of said first master piston 24, by way of hydraulic conduit 99, is connected to brake circuit II.

Provided on the inner wall of the ring portion 24''' is a sealing cup formed as a check valve 23, which, sealingly, is in abutment with the outer wall of the second master piston 80 and, at the rear end, is axially confined by an apertured ring 89. Ring portion 24''' extends from apertured ring 89 a distance toward the master cylinder bottom 79; however, radially inwardly a recess 81 is provided through which the apertured ring 89 is connected to annular chamber 22 surrounding the second master piston 80.

As the annular cup, at the same time, is formed as a check valve 23, it will open a flow path in the event that the pressure in the annular chamber 22 is in excess of the pressure in the pressure chamber 76. Provided ahead of check valve 23 formed by the sealing cup between the second master piston 80 and the ring portion 24''', is an annular gap 90 to thereby establish a continuous flow medium connection f between the annular chamber 22 and the pressure chamber 76.

Radial bores 94 branch from the annular gap 90 to terminate radially outwardly into the radial narrow annular chamber 95 between the master piston 24 and the master cylinder 11 axially extending between two seals 96.

The controlled pressure GD prevailing in the controlled pressure chamber 84' and applied to the front face 84 of the master piston 24, by way of another hydraulic conduit 86, will also be supplied to a brake circuit III by way of a normally opened closure valve SO of the two rear axle wheel brake cylinders 14, 15 connected in parallel. Another hydraulic conduit 87, by way of a normally closed opening valve SG from the rear axle wheel brake cylinders 14, 15 leads back to the intake reservoir 27.

Closure valve SO and opening valve SG are activated by a wheel slip brake control means (now shown) as indicated by control conduits 88 shown in broken lines. In the event of a wheel slip on the rear wheels as detected by a sensor, first the closure valve SO will close in order to limit the pressure in the wheel brake cylinders 14, 15. Should this not yet be sufficient to prevent a slip from occurring, the opening valve SG, in addition, would open. Generally, at the beginning of a wheel slip, a cyclical opening and closing of the valves SO and SG will occur thereby consuming a predetermined amount of pressure medium to be replenished by the pump 18.

The way of operation of the closing and opening valves SO and SG, respectively, on the front wheel brake cylinders 12, 13 associated to the brake circuits I and II, respectively, corresponds to the way of operation of the afore-described function of the valves designated by identical reference numerals, on the wheel brake cylinders 14, 15 of the rear axle.

Moreover, the controlled pressure GD will be applied in parallel to the two switch valves 21, 21' normally occupying the closed position of FIG. 1, in which the switch valves 21, 21' connect the annular chambers 22, 122, by way of hydraulic conduits 35, 35' and 101, 101', respectively, to the intake reservoir 27.

At an initial wheel slip, the switch valves 21, 21' will switch into their second switching position in which the hydraulic conduits 35, 101 are separated from the intake reservoir and connected to the controlled pressure GD by way of the hydraulic conduit 101".

The electromagnets actuating the switch valves 21, 21', by way of feed-in lines 154 and 155, respectively, are connected to a differential pressure control circuit 148 which, in turn, is connected, by way of hydraulic control conduits 149, 150 to the pressure chambers 76, 176 of the two master pistons 24, 80.

Moreover, the wheel slip brake control system (not shown) applied pressure to the differential pressure control circuit 148 by way of a control conduit 88', with the differential pressure control circuit receiving a switch signal for the two electromagnets of the switch valves 21, 21' as soon as a beginning wheel slip is detected by a sensor (not shown) on the motor vehicle wheel in question.

Provided that approximately the same pressure prevails in both pressure chambers 76, 176, two switches 152, 153 contained in the differential pressure control circuit 148 are closed and connect the wheel slip brake control system to the switch valves 21, 21'.

If a wheel slip now occurs on one of the front wheels, the associated switch valve 21, 21' is reswitched into the second position and applies the controlled pressure to the pressure chamber 76 and/or 176 in question. Now the associated check valve 23 or 123 will open so as to now allow pressure medium to flow by way of the check valve 21 and/or 21' and the check valve 23, 123 into the pressure chamber 76, 176 and from there to the wheel brake cylinders 12 or 13 into brake circuits I, II should this be required in the event of an excessive pressure medium consumption.

As a restoring force will be exerted upon the master piston 24 by the pressure build-up in the pressure chamber 76 after reswitching of the switch valve 21 and opening of the check valve 23, which restoring force is in excess of the feed force directed across the front face 84, the pedal holding annular chamber 25 is provided on the annular step 83 of the master cylinder 11, which pedal holding annular chamber 25, by way of a hydraulic conduit 32, is in communication with a pedal holding valve 26. The pedal holding valve 26 includes a sleeve valve 28 sliding in a cylinder 29, with the pressure side 105 of the said sleeve valve 28, by way of a hydraulic conduit 106, being connected to the hydraulic conduit 35 to which the controlled pressure GD is applied with the switch valve 21 opened. At the end of the sleeve valve 28 facing away from the pressure chamber 105, it comprises a tapering connecting piece 107 coupled to which is a slide piston 108 the diameter of which is between that of the connecting piece 107 and that of the sleeve valve 28, with slide piston 108 being slidable within a cylinder section 109 of a correspondingly smaller diameter. A restoring spring 110 will load the sleeve valve 28 against the pressure application in order that the sleeve valve 28 with no pressure application will always occupy the position as shown in FIG. 1.

Formed about the connecting piece 107 is an annular cylindrical chamber 30 on which are provided in axially staggered relationship two connections 73, 74. Located between the annular cylindrical chamber 30 and the chamber receiving the spring 110 is a pressure balancing conduit 111 provided in the connecting piece 107 and the slide piston 108.

The hydraulic conduit 32 is in communication with the connection 74 while another hydraulic conduit 31 leads from connection 73 to conduit 35' connected to intake reservoir 27.

The way of operation of the motor vehicle brake according to FIG. 1 is as follows:

When applying the brake pedal 16, the master piston 24, owing to the pedal force and the controlled pressure built up in the control pressure chamber 84' will be advanced, with a pressure being built up in the pressure chamber 76 which, by way of the hydraulic conduit 99, is applied to the brake circuit II and which, moreover, causes the advance movement of the second master piston 80. This, in turn, will build up pressure in pressure chamber 176 which is applied to brake circuit I. As the pedal holding annual chamber 25, in this phase, is in abutment with the intake reservoir 27, pressure medium can be introduced into and discharged from the annular chamber 25 in accordance with the advance movement of the master piston 24.

Consumed pressure medium, if any, in the brake circuits I and II, during retraction of the master pistons 24, 80 will be resupplied by the intake reservoir, by way of the switch valves 21, 21' and the check valves 23, 123 formed as sealing cups.

If a wheel slip occurs on one of the rear wheel brake cylinders 14, 15, valves SO and SG associated to the rear wheel brake cylinders 14, 15 will cyclically open and close to avoid locking of one of the rear wheels, with the required pressure medium being resupplied, by way of the hydraulic conduit 86, by the pump 18 directly.

In the event that a wheel slip occurs on one of the front wheel brake cylinder 12, 13, the switch valves 21, 21', by way of the control conduit 88' and the closed switches 152, 153—depending on where the wheel slip occurs - will be reswitched so that the controlled pressure GD, by way of the annular chamber 22 and 122, respectively, and the check valves 23 and 123, respectively, formed as sealing cups, will now be applied to the pressure chambers 76 and 176, respectively, thereby resupplying the required amount of pressure medium into brake circuits I and II, respectively, in the manner as required.

In the event that the switich valve 21 was opened, the controlled pressure would also be applied to the pressure chamber 105 of the pedal valve 26 causing the same to occupy its closing position in which the pedal holding annular chamber 25 will be separated from the intake reservoir 27 and locked outwardly. In this manner, a withdrawal of the master piston 24 and of the brake pedal 16, respectively will be avoided in the event that a wheel slip occurs.

In the event of a failure of one of the two brake circuits I or II, the hydraulic pressure in the respective feed-in line 150 and 149, respectively leading to the differential pressure control circuit 148 will break down resulting in opening of the associated switch 152 and 153, respectively as shown in FIG. 1 and, hence, the switch-off of the associated switch valve 21 and 21', respectively. Hence, in the event of a failure of, for example, the front wheel brake circuit II, switch 152, by way of the feed-in line 149, will be opened and the switch valve 121 will be reswitched into the closing position as shown in FIG. 1. No pressure medium will now any longer be supplied by way of switch valve 21 into the defective brake circuit II.

However, the switch 153 will remain closed so that the switch valve 21' will remain open and brake circuit I will continue to work under the normal wheel slip brake control.

Due to the failure of the brake circuit II and the connection of the annular chamber 22 to the intake reservoir 27, now the brake pedal 16 will slip through to such an extent that the righthand front side of the second master (viewed in FIG. 1) will abut piston bottom 24" so that the brake circuits I and III now are still fully operable.

In the event of a failure of brake circuit I, switch 153 will open whereas switch 152 will remain closed.

Figure 2:
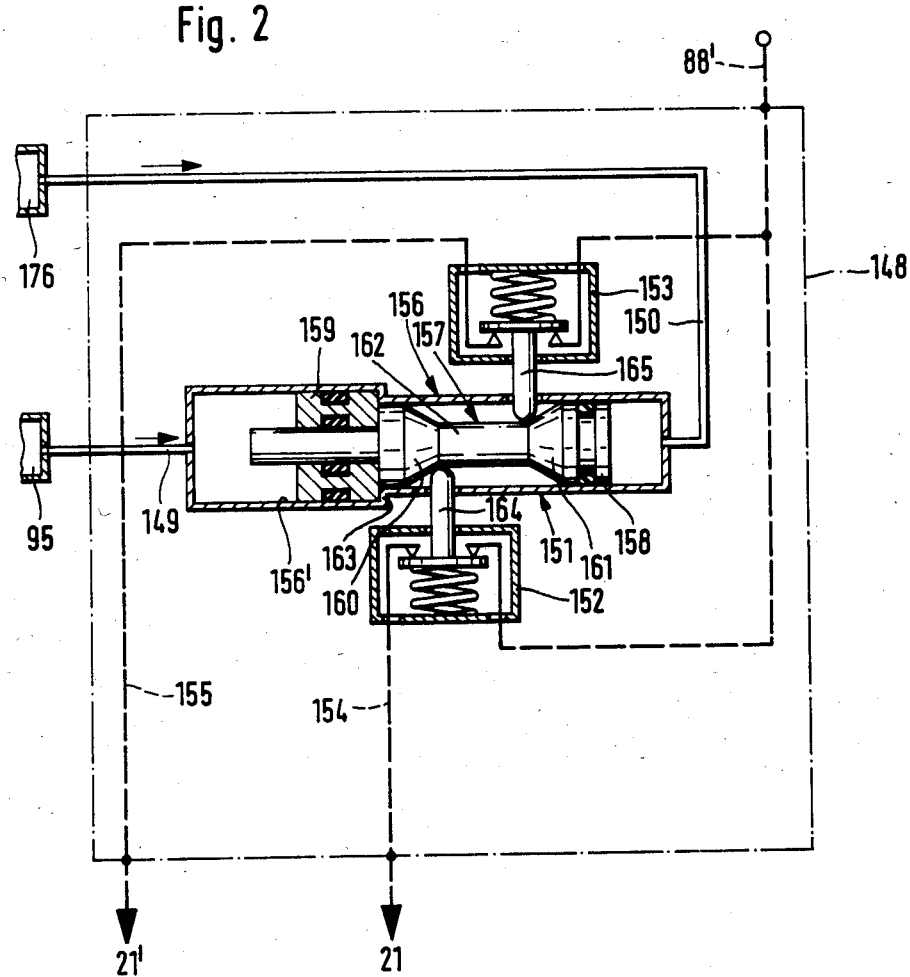

FIG. 2 shows a preferred form of embodiment of the differential pressure control circuit 148 according to FIG. 1 which, according to FIG. 2, comprises a differential pressure slide arrangement 151 on which are provided the two switches 152, 153 on diametrically opposite sides but in axially staggered relationship.

The differential pressure slide arrangement 151 includes a stepped cylinder 156 having a cylindrical section 156' of larger diameter in which a slide 157 is axially displaceable.

The slide 157 comprises in axially spaced relationship two end pistons 158, 159 inwardly coupled to which are two switch ramps 160, 161 held in axially spaced relationship by a straight-lined connecting piece 162.

In the area of switch ramps 160, 161, switch push rods 164, 165 radially protrude almost to the surface of the straight-lined connecting piece 162. The push rods 164, 165 are connected to the movable contacts of switches 152, 153.

While the pressure chamber of cylinder 156 provided on the side of the end piston 158 of smaller diameter is connected to the control conduit 150, the pressure chamber of the expanded cylindrical section 156' applying pressure to the piston 159 of larger diameter is connected to control conduit 149.

FIG. 2 shows the mid-position taken by the differential pressure slide arrangement 151 in normal operation in which the switch push rods 164, 165 are near the straight-lined connecting piece 162 at the beginning of the switch ramps 160, 161.

As the diameter of the end piston 159 is in excess of that of the end piston 158 while the pressures applied to the pressure chambers are approximately equal, slide 157 will be displaced into the righthand end position as shown in FIG. 2 in which the end piston 159 is in abutment with the annular step 163 thereby defining a clear cut mid-position. In the event that now the pressure fails in one of the pressure chambers of the differential pressure slide arrangement 151, the slide 157 will be displaced toward the pressure chamber concerned because the pressure in the opposite pressure chamber will be maintained. Consequently, either the switch 152 or the switch 153 will be opened while the other switch will remain closed as the push rod thereof is provided in the area of the straight-lined connecting piece 162.

In the event of a failure of one of the two static brake circuits connected to the master cylinder, hence, the wheel slip brake control will be fully maintained in the rest of the brake circuits.

The electronic control, generally, is so performed that in the event of a failure of one of the brake circuits to which pressure is applied by the master piston, first both switch valves 21, 21' are placed into the closing position. Only after a predetermined short period of time of, for example, 1 second having lapsed the switch valve of the still intact brake circuit will be switched on again.

It should be noted that switches 152 and 153, respectively, will also open already prior to a wheel slip brake control in the event that the associated brake circuit will be defective so that in case of a brake control the switch valve in question will not be reswitched into the opening position before.

In the event that the energy supply will fail, the switch valves 21, 21' cannot be reswitched into the opening position before.

In the event of a failure of a brake circuit, hence, the associated switch 152, 153, respectively will be opened which, at the same time, can be utilized for releasing an audible signal or for actuating a warning light.

What is claimed is:

1. A hydraulic servo brake for motor vehicles, comprising a pedal-operated tandem master cylinder including two master pistons, wheel brake cylinders connected thereto by way of at least one brake circuit, a brake valve connected between the pedal and the first master piston, which brake valve upon actuation through the brake pedal, applies, in controlled manner, pressure medium supplied by a hydraulic pump connected to an intake reservoir, to the first of said master pistons and, optionally, to a brake circuit directly to provide there a controlled pressure, and comprising a wheel slip brake control system which at the beginning of a slip occuring on one or more motor vehicle wheels, will automatically reduce the brake force on the motor vehicle wheels to a value just sufficient to permit the wheels to turn and which comprises a switch valve to which the controlled pressure is applied equally which switch valve is normally closed and at the beginning of a slip of one or more motor vehicle wheels will open to apply the controlled pressure to the master cylinder from where the pressure medium is passed by way of two check valves to the pressure chambers located behind the master pistons to which pressure chambers the brake circuits are connected, wherein one switch valve (21, 21') is provided for each pressure chamber (76, 176), with each of such switch valves (21, 21') being connected to the wheel slip brake system by way of a differential pressure control circuit (148) which in response to exceeding a predetermined pressure difference in the two master cylinder pressure chambers (76, 176) indicative of the failure of a brake circuit (I, II) will close the switch valve (21 or 21') of the pressure chamber (76, 176) in which the lower pressure prevails.

2. A motor vehicle brake of claim 1, wherein a pressure signal from one or from the other of said pressure chambers (76 and 176) is applied to the differential pressure control circuit (148) by way of control conduits (149, 150).

3. A motor vehicle brake of claim 2, wherein the pressure signal is an electric signal.

4. A motor vehicle brake of claim 2, wherein the pressure signal is a hydraulic signal.

5. A motor vehicle brake according to claim 4, wherein each switch valve (21, 21') connects the associated chambers (22, 122) disposed behind the check valves (23, 123), in closed condition, to the intake reservoir (27).

6. A motor vehicle brake according to claim 1, wherein the differential pressure control circuit (148) comprises a three-position differential pressure slide arrangement (151) which is connected by way of hydraulic control conduits (149, 150) to respectively one of the brake circuits (II and I, respectively) to which pressure is applied from the master cylinder (II), and which comprises two switches (152, 153), of which, in the one end position, a first one is open and the second one closed and, in the other end position, the second one is open and the first one closed whereas, in the mid-position, both switches (152, 153) are closed, and that the switches (152, 153) are connected into the feed-in lines (154, 155) leading to the switch valves (21, 21').

7. A motor vehicle brake according to claim 6, wherein the differential pressure slide arrangement (151) comprises a cylinder (156) and a slide (157) displaceably disposed therein which slide (157) includes two end pistons (158, 159) and two switch ramps disposed therebetween tapering with respect to one another and cooperating with respectively one of the switches (152, 153) provided on the cylinder (156), between which ramps a straight-lined connecting piece (162) extends.

8. A motor vehicle brake according to claim 7, wherein push rods (164, 165) extending substantially normal to the straight-lined connecting piece (162) are provided on switches (152, 153), which push rods cooperate with the switch ramps (160, 161) and the straight-lined connecting member (162) in the sense actuating the switches (152, 153).

9. A motor vehicle brake according to claim 8, wherein the end piston (159) connected to the pressure chamber (176) of the second master piston (80) has an enlarged diameter and is accommodated in a cylindrical section (156') being of a correspondingly larger diameter, with the end piston (159) concerned, normally, abutting the annular step (163) at the transition to the cylindrical section (156') provided with a correspondingly larger diameter.

* * * * *